US012485921B2

(12) United States Patent
Fahoum et al.

(10) Patent No.: US 12,485,921 B2
(45) Date of Patent: Dec. 2, 2025

(54) ALTERNATIVE DRIVING MODELS FOR AUTONOMOUS VEHICLES

(71) Applicant: IMAGRY ISRAEL LTD., Haifa (IL)

(72) Inventors: Khaled Fahoum, Acre (IL); Adham Ghazali, Haifa (IL); Suhail Habib, Haifa (IL)

(73) Assignee: IMAGRY ISRAEL LTD, Haifa (IL)

( * ) Notice: Subject to any disclaimer, the term of this patent is extended or adjusted under 35 U.S.C. 154(b) by 275 days.

(21) Appl. No.: 17/929,300

(22) Filed: Sep. 1, 2022

(65) Prior Publication Data
US 2024/0075950 A1 Mar. 7, 2024

(51) Int. Cl.
*B60W 60/00* (2020.01)
*B60W 40/04* (2006.01)
*B60W 50/00* (2006.01)
*G06V 20/58* (2022.01)
*H04W 4/40* (2018.01)

(52) U.S. Cl.
CPC ........ *B60W 60/0011* (2020.02); *B60W 40/04* (2013.01); *B60W 50/0097* (2013.01); *B60W 60/00274* (2020.02); *G06V 20/58* (2022.01); *H04W 4/40* (2018.02); *B60W 2420/403* (2013.01); *B60W 2554/4045* (2020.02); *B60W 2556/50* (2020.02); *B60W 2556/65* (2020.02); *G06V 2201/08* (2022.01)

(58) Field of Classification Search
CPC ....... B60W 60/0011; B60W 60/00274; B60W 40/04; B60W 50/0097; B60W 2556/50; B60W 2556/65; B60W 2554/4045; B60W 2420/403; H04W 4/40; G06V 20/58; G06V 2201/08
See application file for complete search history.

(56) References Cited

U.S. PATENT DOCUMENTS 9,330,571 B2 5/2016 Ferguson
2014/0142799 A1* 5/2014 Ferguson ........ B60W 30/18163
701/1

(Continued)

FOREIGN PATENT DOCUMENTS

WO 2021129309 A1 7/2021

OTHER PUBLICATIONS

ISR for PCT/IL2023/050884 (Nov. 27, 2023) (11 pages).

*Primary Examiner* — Todd Melton
*Assistant Examiner* — Oliver Tan

(57) ABSTRACT

A computer program product, a computerized apparatus and a method for generating movement pattern for an autonomous vehicle. The method comprises obtaining a driving scenario comprising a representation of a road segment and a driving destination of an autonomous vehicle driving in the road segment. The driving scenario comprises a second vehicle in the road segment. The method comprises selecting a driving model for the second vehicle from a plurality of driving models. The plurality of driving models comprises at least an autonomous vehicle driving model and a human driver driving model. The method comprises predicting, using the driving model, a predicted movement pattern of the second vehicle within the driving scenario; and based on the predicted movement pattern of the second vehicle, generating a movement pattern for the autonomous vehicle.

20 Claims, 6 Drawing Sheets

(56) References Cited

U.S. PATENT DOCUMENTS

| | | | | |
|---|---|---|---|---|
| 2015/0160653 | A1* | 6/2015 | Cheatham, III | G05D 1/0088 |
| | | | | 701/23 |
| 2019/0367021 | A1* | 12/2019 | Zhao | G08G 1/161 |
| 2019/0367022 | A1* | 12/2019 | Zhao | B60W 30/0956 |
| 2020/0089246 | A1* | 3/2020 | McGill, Jr. | G05D 1/0221 |
| 2020/0249674 | A1* | 8/2020 | Dally | G05D 1/0221 |
| 2020/0377084 | A1* | 12/2020 | Ondruska | G06F 18/295 |
| 2021/0056713 | A1* | 2/2021 | Rangesh | G01S 17/89 |
| 2021/0070286 | A1* | 3/2021 | Green | G06V 10/25 |
| 2021/0174245 | A1* | 6/2021 | Lewis | B25J 9/163 |
| 2021/0188306 | A1* | 6/2021 | Himayat | H04W 4/40 |
| 2021/0276594 | A1* | 9/2021 | Oh | H04W 4/44 |
| 2021/0284191 | A1* | 9/2021 | Raichelgauz | B60W 40/09 |
| 2022/0055640 | A1* | 2/2022 | Wolff | G06N 20/00 |
| 2022/0066459 | A1* | 3/2022 | Jain | G06N 3/047 |
| 2022/0138568 | A1* | 5/2022 | Smolyanskiy | G06N 3/044 |
| | | | | 706/21 |
| 2022/0274603 | A1* | 9/2022 | Karve | G06N 3/047 |

\* cited by examiner

ALTERNATIVE DRIVING MODELS FOR AUTONOMOUS VEHICLES

TECHNICAL FIELD

The present disclosure relates to autonomous driving models in general, and to situation awareness-based models for autonomous driving vehicles, in particular.

BACKGROUND

The technology of autonomous vehicles is moving forward globally in a progression of scaled technology, and may be a significant part of the future of the automotive industry.

Control systems of autonomous vehicles are configured to identify appropriate navigation paths, obstacles and relevant signage, to help the vehicle control the self-driving. At the core of control systems autonomous vehicles is a stack of perception modules whose purpose is to perceive the system's environment, reconstruct it and to make sense of it. As highly automated driving and autonomous vehicles further develop, there is a need to develop and improve such systems, including the vehicle navigation system, autonomous driving models utilized by the vehicle navigation system, or the like.

The modern approach to environmental perception is to utilize specialized lightweight neural networks that can generate precise situational awareness models, which in turn could be used by other modules within the system to create motion plans, interact with the environment and ultimately navigate within it.

BRIEF SUMMARY

One exemplary embodiment of the disclosed subject matter is a method comprising: obtaining a driving scenario, wherein the driving scenario comprises a representation of a road segment and a driving destination of an autonomous vehicle driving in the road segment, wherein the driving scenario comprises a second vehicle in the road segment; selecting a driving model for the second vehicle, wherein the driving model is selected from a plurality of driving models, wherein the plurality of driving models comprises at least an autonomous vehicle driving model and a human driver driving model; predicting, using the driving model, a predicted movement pattern of the second vehicle within the driving scenario; and based on the predicted movement pattern of the second vehicle, generating a movement pattern for the autonomous vehicle.

Optionally, the method further comprises: training a second autonomous vehicle driving model to be utilized by the autonomous vehicle, wherein said training is based on the generated movement pattern of the autonomous vehicle.

Optionally, the autonomous vehicle driving model that is comprised by the plurality of driving models is a version of the second autonomous vehicle driving model being trained.

Optionally, the method further comprises: selecting a second driving model for the second vehicle, wherein the second driving model is selected from the plurality of driving models, wherein the second driving model is different than the driving model; predicting, using the second driving model, a second predicted movement pattern of the second vehicle within the driving scenario; and based on the second predicted movement pattern of the second vehicle, generating a second movement pattern for the autonomous vehicle; wherein said training is further performed based on the second movement pattern, whereby augmenting a single driving scenario training use case based on multiple alternative driving models.

Optionally, the method further comprises instructing the autonomous vehicle to so drive based on the generated movement pattern.

Optionally, said selecting the driving model for the second vehicle comprises: obtaining sensory information from sensors coupled to the autonomous vehicle capturing the second vehicle; identifying a type of the second vehicle based on the sensory information; selecting the driving model based on the type of the second vehicle.

Optionally, said selecting the driving model for the second vehicle comprises: receiving a network communication characterizing the second vehicle, whereby obtaining information about the second vehicle; and selecting the driving model based on the information about the second vehicle.

Optionally, said selecting the driving model for the second vehicle comprises: observing the second vehicle during a time duration; and inferring the driving model based on observed movements of the second vehicle during the time duration.

Optionally, the plurality of driving models further comprises: a second autonomous vehicle driving model, wherein the autonomous vehicle driving model and the second autonomous vehicle driving model are different and provided by different vendors.

Optionally, the plurality of driving models further comprises: a second human driver driving model, wherein the human driver driving model and the second human driver driving model are different and characterize different types of human drivers.

Another exemplary embodiment of the disclosed subject matter is a computerized apparatus having a processor, the processor being adapted to perform the steps of: obtaining a driving scenario, wherein the driving scenario comprises a representation of a road segment and a driving destination of an autonomous vehicle driving in the road segment, wherein the driving scenario comprises a second vehicle in the road segment; selecting a driving model for the second vehicle, wherein the driving model is selected from a plurality of driving models, wherein the plurality of driving models comprises at least an autonomous vehicle driving model and a human driver driving model; predicting, using the driving model, a predicted movement pattern of the second vehicle within the driving scenario; and based on the predicted movement pattern of the second vehicle, generating a movement pattern for the autonomous vehicle.

Optionally, the processor is further adapted to perform the steps of: training a second autonomous vehicle driving model to be utilized by the autonomous vehicle, wherein said training is based on the generated movement pattern of the autonomous vehicle.

Optionally, the autonomous vehicle driving model that is comprised by the plurality of driving models is a version of the second autonomous vehicle driving model being trained.

Optionally, the processor is further adapted to perform the steps of: selecting a second driving model for the second vehicle, wherein the second driving model is selected from the plurality of driving models, wherein the second driving model is different than the driving model; predicting, using the second driving model, a second predicted movement pattern of the second vehicle within the driving scenario; and based on the second predicted movement pattern of the second vehicle, generating a second movement pattern for the autonomous vehicle; wherein said training is further performed based on the second movement pattern, whereby augmenting a single driving scenario training use case based on multiple alternative driving models.

Optionally, the processor is further adapted to perform the steps of instructing the autonomous vehicle to drive based on the generated movement pattern.

Optionally, said selecting the driving model for the second vehicle comprises: obtaining sensory information from sensors coupled to the autonomous vehicle capturing the second vehicle; identifying a type of the second vehicle based on the sensory information; selecting the driving model based on the type of the second vehicle.

Optionally, said selecting the driving model for the second vehicle comprises: receiving a network communication characterizing the second vehicle, whereby obtaining information about the second vehicle; and selecting the driving model based on the information about the second vehicle.

Optionally, said selecting the driving model for the second vehicle comprises: observing the second vehicle during a time duration; and inferring the driving model based on observed movements of the second vehicle during the time duration.

Optionally, the plurality of driving models further comprises: a second autonomous vehicle driving model, wherein the autonomous vehicle driving model and the second autonomous vehicle driving model are different and provided by different vendors.

Optionally, the plurality of driving models further comprises: a second human driver driving model, wherein the human driver driving model and the second human driver driving model are different and characterize different types of human drivers.

Yet another exemplary embodiment of the disclosed subject matter is a computer program product comprising a non-transitory computer readable storage medium retaining program instructions, which program instructions when read by a processor, cause the processor to perform a method comprising: obtaining a driving scenario, wherein the driving scenario comprises a representation of a road segment and a driving destination of an autonomous vehicle driving in the road segment, wherein the driving scenario comprises a second vehicle in the road segment; selecting a driving model for the second vehicle, wherein the driving model is selected from a plurality of driving models, wherein the plurality of driving models comprises at least an autonomous vehicle driving model and a human driver driving model; predicting, using the driving model, a predicted movement pattern of the second vehicle within the driving scenario; and based on the predicted movement pattern of the second vehicle, generating a movement pattern for the autonomous vehicle.

Optionally, the method further comprises: training a second autonomous vehicle driving model to be utilized by the autonomous vehicle, wherein said training is based on the generated movement pattern of the autonomous vehicle.

Optionally, the autonomous vehicle driving model that is comprised by the plurality of driving models is a version of the second autonomous vehicle driving model being trained.

Optionally, the method further comprises: selecting a second driving model for the second vehicle, wherein the second driving model is selected from the plurality of driving models, wherein the second driving model is different than the driving model; predicting, using the second driving model, a second predicted movement pattern of the second vehicle within the driving scenario; and based on the second predicted movement pattern of the second vehicle, generating a second movement pattern for the autonomous vehicle; wherein said training is further performed based on the second movement pattern, whereby augmenting a single driving scenario training use case based on multiple alternative driving models.

Optionally, the method further comprises instructing the autonomous vehicle to drive based on the generated movement pattern.

Optionally, said selecting the driving model for the second vehicle comprises: obtaining sensory information from sensors coupled to the autonomous vehicle capturing the second vehicle; identifying a type of the second vehicle based on the sensory information; selecting the driving model based on the type of the second vehicle.

Optionally, said selecting the driving model for the second vehicle comprises: receiving a network communication characterizing the second vehicle, whereby obtaining information about the second vehicle; and selecting the driving model based on the information about the second vehicle.

Optionally, said selecting the driving model for the second vehicle comprises: observing the second vehicle during a time duration; and inferring the driving model based on observed movements of the second vehicle during the time duration.

Optionally, the plurality of driving models further comprises: a second autonomous vehicle driving model, wherein the autonomous vehicle driving model and the second autonomous vehicle driving model are different and provided by different vendors.

Optionally, the plurality of driving models further comprises: a second human driver driving model, wherein the human driver driving model and the second human driver driving model are different and characterize different types of human drivers.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
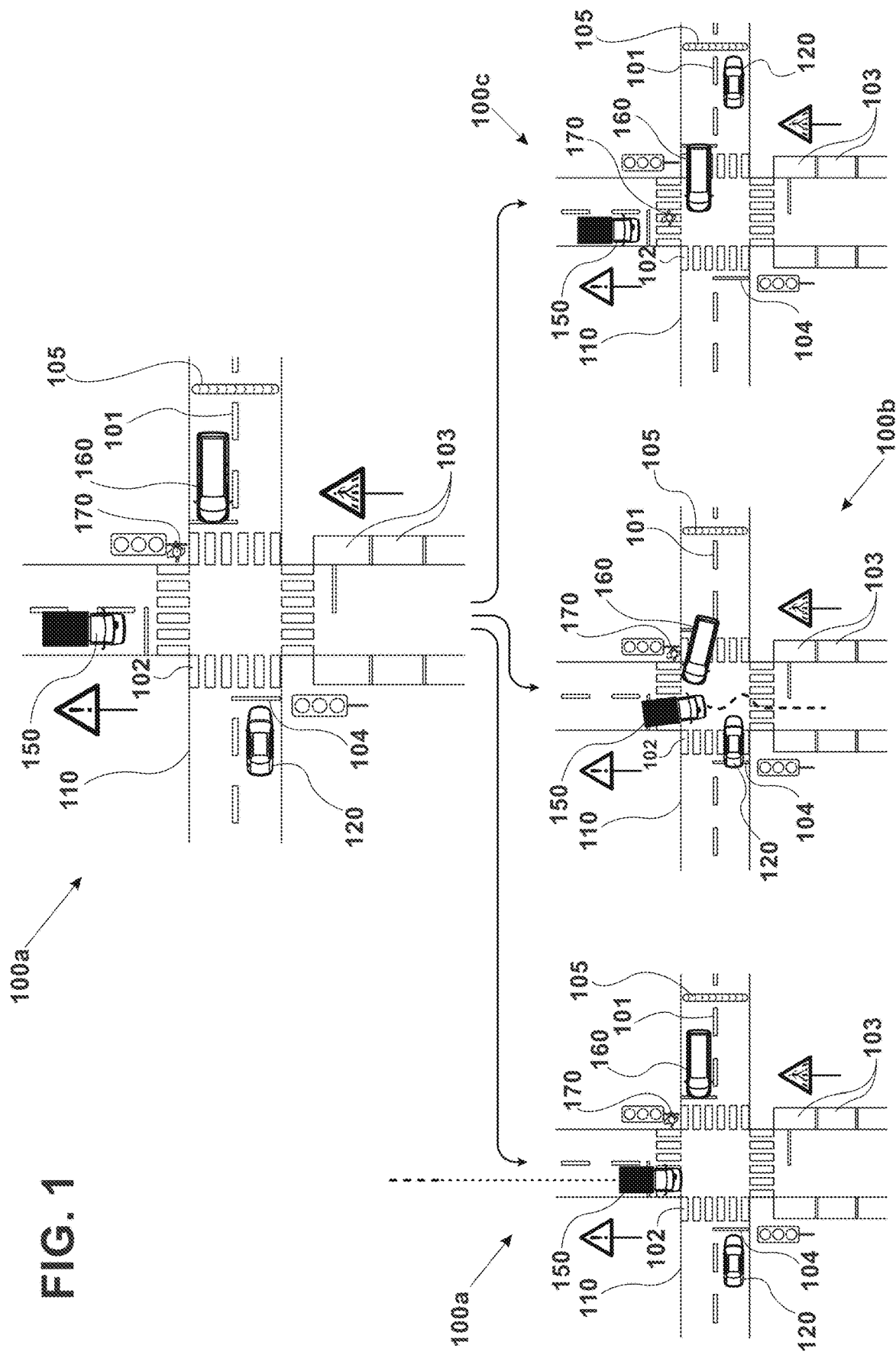
FIG. 1 shows a schematic illustration of exemplary alternative driving scenarios, in accordance with some exemplary embodiments of the disclosed subject matter.

One technical problem dealt with by the disclosed subject matter is to provide accurate decision systems of self-navigation of autonomous vehicles. In some exemplary embodiments, decision systems of self-navigation of autonomous vehicles may be based on machine learning techniques, such as regression algorithms, decision matrix algorithms, Neural Networks, or the like. Decision systems may be configured to continuously render the surrounding environment, perceive the world, learn and plan, in real time, the best movement for the autonomous vehicle in order to provide an optimized navigation of the autonomous vehicle. The decision systems may be required to make real time data-driven complex decisions, based on sensory data capturing the driving environment, that may provide multiple optional driving contexts. Autonomous driving systems may be required to handle real time data-driven complex decisions relying on observed environment. However, the systems may be unable to cope with unknown scenarios and may misbehave when the input diverges from their expected domains.

Additionally or alternatively, it may be required to provide safer decisions that mimic human driver's psychological maturity that involves innate survival and danger avoidance. In some exemplary embodiments, human drivers may behave in an incorrect behavior or taking an apparently unsafe decision, in order to avoid a more dangerous situation, such as proceed driving against a yellow traffic light to avoid a crash or any other unsafe situation. A training methodology that combines supervised and imitation learning may be required, in order to provide better decisions that imitates real human drivers' driving decisions.

Another technical problem dealt with by the disclosed subject matter is to enhance the training phase of motion planning for decision systems of self-navigation of autonomous vehicles, in order to enable the system to navigate in new locations independently. In some exemplary embodiments, the greatest part of maturity efforts in autonomous driving systems may be spent on collecting and understanding training data. The training datasets utilized for training the system can be very big, as being sprawled over infinite space, however, may not be useful, as not covering all possible situations and locations, being generated by extra-careful drivers or based on strict rules, or the like.

Yet another technical problem dealt with by the disclosed subject matter is generating accurate situational awareness models for autonomous driving systems. In some exemplary embodiments, autonomous driving models may be generated and trained based on perception modules that are configured to perceive the system's environment, reconstruct it and understand is. Situational awareness models may be utilized by different modules of the autonomous driving systems for providing perception of environmental elements and events with respect to time or space of the driving environment, the comprehension of their meaning, and the projection of their future status on planning the driving path, taking driving decisions, creating motion plans, interacting with the environment, ultimately navigate within it, or the like. In some exemplary embodiments, situation awareness may be a critical, yet often elusive, foundation for successful decision-making across a broad range of situations in autonomous driving systems, especially situations combining dynamic objects, such as pedestrians, other vehicles, or the like, which their movement may not always known or predictable. Lacking or inadequate situation awareness may be a major factor in inaccuracy of autonomous driving models.

In some exemplary embodiments, environmental perception may be performed based on specialized lightweight neural networks that can generate precise situational awareness models. The comprehension in perceiving the world through a neural network may be lacking and incomplete. The perception in many cases may not be reliable, as being may be prone to noise, artifacts and errors, generating false positives, being difficult to parse and analyze, or the like. In some exemplary embodiments, rule-based solutions may attempt to solve comprehension problems by laying down fixed heuristics of perception rules and operating within the limited scopes of code-based algorithms. Such solutions may result in inability to cope with unknown situations and misbehaving when the inputs diverge from their expected domains.

One technical solution is to determine driving decisions based on potential movement models of dynamic objects in the driving environment, in general, and to of other vehicles in particular. In some exemplary embodiments, objects that may potentially alter the driving path may be static objects, that the driving decision associated based thereon may be automatically learned based on similar classified use-cases, without the need of further analysis. Additionally or alternatively, objects that may potentially alter the driving path may be dynamic objects, such as pedestrians, vehicles, or the like; which their movement may be affected by different factors, or by other elements of the driving environment, such as other objects defining traffic rules, subjective behaviour, different reaction to objects in the driving environment, or the like. As an example, different autonomous vehicles may drive according to different driving models, e.g., driving models from different vendors. As another example, different drivers may drive differently in the same driving situation, different human driving models may characterize different types of human drivers, or the like. As yet another example, different pedestrians may act differently in similar situations.

In some exemplary embodiments, in response to identifying a moving vehicle in the road segment, that may potentially affect the driving decision, a potential driving model of the vehicle may be determined. In some exemplary embodiments, the potential driving model may be an autonomous vehicle driving model, a semi-autonomous driving model, a human driver driving model, or the like.

In some exemplary embodiments, a predicted movement pattern of the vehicle may be predicted using the potential driving model. As an example, the predicted movement pattern may be obtained by applying the potential driving model on the driving scenario as perceived by the other vehicle. As another example, the predicted movement pattern may be obtained using artificial intelligence (AI) models imitating a driving style of a driver of the other vehicle in accordance with the driving model.

In some exemplary embodiments, a movement pattern for the autonomous vehicle may be generated based on the predicted movement pattern of the vehicle. The autonomous vehicle may be instructed to drive based on the generated movement pattern.

In some exemplary embodiments, the driving model selected for the other vehicle may be selected based on a type of the other vehicle. The type of the other vehicle may be identified based on sensory information from sensors coupled to the autonomous vehicle capturing the other vehicle. The sensory information may comprise visual elements associated with the type of the vehicle, visual input capturing the vehicle, or the like. As an example, the type of the vehicle may be identified based on extracted characteristics of the vehicle, such as based on a shape of the vehicle, based on an identified logo placed on the vehicle, or the like. As another example, the type of the vehicle may be identified based on analysis of the visual input capturing the vehicle, such as flashing light colours or patterns, or the like. Additionally or alternatively, the type of the vehicle may be identified based on analysis of other types of sensors data, such as audible data, such as siren tones, noise of engine, or the like.

Additionally or alternatively, the driving model selected for the other vehicle may be selected based on information about the vehicle obtained from a network communication characterizing the second vehicle, received by the autonomous vehicle, by the navigation system, or the like. As an example, the network communication may be established between similar vehicles, vehicles from a same vendor, or the like. As another example, the network communication may be received from an external platform, such as based on input from insurance companies, based on input from automatic navigation systems utilized by the other vehicle or from navigation apps utilized by the driver of the other vehicle, or the like.

Additionally or alternatively, the driving model selected for the other vehicle may be inferred based on observed motion of the other vehicle during a time duration, such as for 5 seconds, 10 seconds, a minute, or the like. The observed motion of the other vehicle may be analysed in conjunction with its spatial location and extracted information relevant to it, such as the lane it is presently on, the status of the traffic light relevant to its position, the presence of a 4-way-stop-sign intersection, or the like.

Another technical solution is to train autonomous driving models based on syntactically generated training data in accordance with multiple alternative driving models. In some exemplary embodiments, a single driving scenario training use case may be augmented based on different applicable alternative driving models of other vehicles. An autonomous vehicle driving model may be trained based on movement patterns of the autonomous vehicle generated based on movement pattern of the other vehicles in the road segment predicted using alternative driving models.

In some exemplary embodiments, for each moving vehicle in the driving scenario, that may potentially affect the driving decision, multiple alternative driving models that may be potentially applicable for the vehicle, may be selected. In some exemplary embodiments, the multiple alternative driving models may comprise different types of models, such as models associated with different autonomy levels (e.g., autonomous, semi-autonomous, non-autonomous, or the like), driving models from different vendors, driving models using different classification or prediction methods, or the like.

In some exemplary embodiments, multiple respective predicted movement patterns of the vehicle may be predicted using the multiple alternative driving models. Respective driving decisions may be determined for the autonomous vehicle based on each movement pattern of the multiple movement patterns of the vehicle. Accordingly, a training data set may be generated based on the training use case represented by the driving scenario, based on the multiple alternative driving models.

One technical effect of utilizing the disclosed subject matter is enhancing training of autonomous driving models. Training based on multiple AI models enables to provide every possible scenario to challenge the decision making. Such training enables to provide different situations that may change the decision as if decided by experienced drivers. Furthermore, augmenting training use cases based on selecting multiple AI models for determining movement of dynamic objects provides a dynamic training that requires smaller amounts of data to encompass the rules of driving a vehicle on each road. As an example, in an internal test, training on 100 k frames was enough to generalize the autonomous driving system on 85% of Cupertino's roads. It may be noted that the rarest interventions could be the most dangerous ones, and a system cannot rely on statistical occurrences to shape the training set. The disclosed subject matter enables to simulate intervention scenarios and preemptively annotate dangerous and rare scenarios in order to fill potential gaps in the training set.

Another technical effect of utilizing the disclosed subject matter is providing a solution to the infinitely complex problem of generating training datasets that cover all possible scenarios. Due to the combinatorial explosion of cases, it may be guaranteed that handling one type of behavior will inadvertently degrade another. However, the disclosed subject matter solves the decision-making aspect of motion-planning, thereby effectively translating driving scenarios to a data problem as opposed to a conceptual algorithmic problem. Furthermore, the disclosed subject matter introduces new behavioural features in a finite and future-proof task of adding relevant data only once, without requiring a continuous or future maintenance.

Yet another technical effect of utilizing the disclosed subject matter is providing a contextual comprehension of the dynamic environment, unlike classical motion planning algorithms which may be required to perceive the dynamic environment, by motion-planning model itself or by an intermediate comprehension layer that is conceptually in the domain of perception, but is disjointed from it. The disclosed subject matter un-necessitates the requirement to manually develop algorithms to classify the behavior of dynamic objects in the environment, classify the ego vehicle's "status" (as it were), or the like.

Yet another technical effect of utilizing the disclosed subject matter is providing an automatic annotation tool that takes the programmer out of the equation. The onus of implicitly (or explicitly) classifying the behavior of various actors in the environment, as well as comprehending the situation of the ego vehicle may be transferred from the programmer to the annotator—who may be a human driver. This renders the problem tractable: every annotator knows how to "drive" given a certain situation. So instead of developing algorithms that will always have blind spots and will always cause degradation in existing behaviors, the disclosed subject matter may add varied data to the training set and place the responsibility for understanding the contextual classifications on the network.

Yet another technical effect of utilizing the disclosed subject matter is providing a highly configurable autonomous driving system that can be adjustable to any law system. The same system may be configured to allow Right-On-Red decisions in the US (car turning right on a red traffic light intersection) but disable it in Israel where the rule doesn't apply. The disclosed subject matter further enables automatically adjusting the training set and the decisions to account for platforms of different dimensions, such as small cars, buses, articulated vehicles, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a schematic illustration of an exemplary neural network, in accordance with some exemplary embodiments of the disclosed subject matter.

In some exemplary embodiments, a Driving Scenario 100 may comprise a representation of a Road Segment 110 and a driving destination of an Autonomous Vehicle 120 driving in Road Segment 110.

In some exemplary embodiments, the long-term route or driving destination may be translated into local instructions in accordance with the representation of the road segment and on real time lane localization.

Additionally or alternatively, the driving destination may be obtained via short-range navigational commands provided manually from field engineers, such as during development of a control system of Autonomous Vehicle 120, during training, demonstrating, testing, or the like. Additionally or alternatively, the driving destination may be obtained via short-range navigational commands provided automatically from long-range navigation systems In, during training, long-term navigational instructions may be ignored. The network may be trained to output 3 possible courses of action (i.e., 3 trajectories that the ego vehicle can travel), roughly corresponding to a verbal "left/right/forward" instruction. Such courses of action may refer to the short-range local context. For example, in a multi-lane street without turns, the instruction "right" means "change lane to the right". However, in nearing a turn to the right, the same instruction, "right", means "take this turn". Any long-term navigational instructions, similar to instructions provided by Waze™, Google™ maps, may be translated to an instruction the system understands, and be able to select the correct course of action out of the possible 3. E.g., "stay on either of the two left lanes in 1000 feet" may be translated either to "left", "forward", or "right".

Additionally or alternatively, during driving, the system may be configured to decide which course of action to select, out of the 3 possible courses of action that the network outputs. While testing, we do this manually via keyboard instructions—the engineer presses the left arrow, and it instructs the navigation system it should change lane left or take a left turn or do a U-turn, depending on the context of the scene. During demonstrations, geo-fenced intents may be utilized based on GPS location on the global heading, to assign a predefined instruction.

Additionally or alternatively, the network may be trained to output generic unlimited command types, such as more sophisticated or general driving instructions, e.g., "keep lane", "make a left turn", "make a left U turn", "left lane switch", "take right turn", "park", or the like. In some exemplary embodiments, such in in training embodiments, Driving Scenario 100 may be a synthetic scenario, a real scenario, a scenario observed by a testing vehicle, a real time driving scenario, or the like. In some exemplary embodiments, the driving model selected to predict the movement pattern of Vehicle 150 may be the autonomous vehicle driving model being trained, or a version thereof, such as a current version, an initial version, or the like. Additionally or alternatively, such as in real-time driving embodiments, Driving Scenario 100 may be obtained or generated based on an aggregation of inclusive representations of the environment of as generated by various perception modules, either of Autonomous Vehicle 120, or module of other vehicles, other systems observing Road Segment 110.

In some exemplary embodiments, Driving Scenario 100 may comprise a representation of a road geometry of Road Segment 110, such as asphalt, lane dividers (such as 101), crosswalks (such as 102), parking lots (such as 103), stop lines (such as 104), speed bumps (such as 105), or the like. Additionally or alternatively, Driving Scenario 100 may comprise a representation of static objects within Road Segment 110, such as cones, fences, generic static objects, traffic signs, traffic markers, or the like. Additionally or alternatively, Driving Scenario 100 may comprise a representation of objects that define traffic rules, such as traffic lights, stop signs, signs associated with specific instructions, such as "give way" signs (upturned triangle), "no-U-turn" signs, "left-only arrow" signs, or the like, that may be further classified based on their status (e.g. green traffic lights), their relevancy to Autonomous Vehicle 120 (e.g. stop signs facing other driving lanes, no-right-on-red signs whose relevancy depend on the driving decision and intent), or the like. Additionally or alternatively, Driving Scenario 100 may comprise a representation of dynamic objects in Road Segment 110, such as Vehicle 150, Pedestrian 170, or the like.

In some exemplary embodiments, Autonomous Vehicle 120 may be operated using a control system, such as an autonomous navigation system, autonomous driving system, or the like. The control system may be configured to perceives the world frame-by-frame while maintaining historic information across time. The control system may be configured to navigate and control Autonomous Vehicle 120 based on the perception of the world as represented by Driving Scenario 100, perform the autonomous driving, such as for finding directional, correlating positions on the road, adjusting the route, or the like, to autonomously drive Autonomous Vehicle 120 in accordance with Driving Scenario 100, or the like. The control system may be configured to provide a comprehensive decision-making and motion-planning plan for Autonomous Vehicle 120.

In some exemplary embodiments, control system of Autonomous Vehicle 120 may be configured to observe and monitor features of dynamic object in Road Segment 110 such as brake lights, side blinkers, reverse lights or the like of Vehicle 150. Additionally or alternatively, control system of Autonomous Vehicle 120 may be configured to identify a type of Vehicle 150, based on sensory information obtained from sensors coupled to Autonomous Vehicle 120, such as visual input capturing Vehicle 120 obtained from visual sensors mounted on Autonomous Vehicle 120. In some exemplary embodiments, the type of Vehicle 150 may be determined based on an identifier (such as a logo, and identifiable element, external features, or the like) thereof captured in the visual input. As an example, the logo of Vehicle 150 may be extracted from the visual input, based on a luminous taxi top sign identified in the visual input, based on a numerical registration identifier on registration plate of Vehicle 150, or the like.

Additionally or alternatively, control system of Autonomous Vehicle 120 may be configured to observing the dynamic objects in Driving Scenario 100, such as Vehicles 150 and 160 during a time duration, such as for a continuous 5, timeframes, 10 timeframes, 20 timeframes, or the like, in order to generate movement plans based thereon. Each timeframe may be 10 seconds, 20 seconds, 1 minute, 5 minutes, or the like.

Additionally or alternatively, control system of Autonomous Vehicle 120 may be configured to store or save historical information from a last predetermined number of timeframes, or latest predetermined timeframe, or the like. As an example, the control system of Autonomous Vehicle 120 may be configured to generate a speed profile of Autonomous Vehicle 120 itself and of other dynamic objects in Driving Scenario 100, such as Vehicles 150 and 160, Pedestrian 170, or the like; within a latest predetermined time-window, such as the latest 30 seconds, the latest minute, or the like. As another example, the control system of Autonomous Vehicle 120 may be configured to determine a traffic light classification profile representing a state of all present traffic lights within Driving Scenario 100 within the latest predetermined time-window.

Additionally or alternatively, control system of Autonomous Vehicle 120 may be configured to observe and monitor features and gestures of Pedestrian 170, in order to determine intent thereof (e.g., is Pedestrian 170 looking towards the road, communicating with the driver, gesturing, moving, intending to cross the street, or the like. Additionally or alternatively, Additionally or alternatively, control system of Autonomous Vehicle 120 may be configured to monitor and record trajectories of dynamic objects, such as vehicles (Vehicle 150), pedestrians (e.g., Pedestrian 170), motorcycles, bicycles, animals or the like.

In some exemplary embodiments, one or more driving models may be selected for Vehicle 150. The one or more driving models may be selected from a plurality of driving models, such as from a database of driving models accessible by the control system of Autonomous Vehicle 120, a set of driving models previously identified or defined using AI models of the control system of Autonomous Vehicle 120, external sets of driving models, or the like. In some exemplary embodiments, the plurality of driving models may comprise several autonomous vehicles driving model, such as models of vehicles from different vendors, such as Otto™, Starsky Robotics™, Ocado™, Tesla™ Uber™, or the like. Additionally or alternatively, the plurality of driving models may comprise several human driver driving model, such as models determined based on driving style of the driver, models associated with demographic features of the driver, models associated with certain known drivers or driver profiles, or the like.

It may be noted that the selection of potentially applicable driving models for Vehicle 150 may be different than the selection of a driving model for Vehicle 150 during execution of the autonomous vehicle driving model, e.g., during actual driving. As an example, during actual driving, the most suitable driving model, such as the driving model with the highest matching measurement, may be selected for predicting the movement pattern of Vehicle 150. However, during training, multiple models may be selected, such as top 10 ranked models, top 5 ranked models, models from different types or categories, or the like.

In some exemplary embodiments, the driving model selected for the Vehicle 150 may be selected based on the type of Vehicle 150. Additionally or alternatively, the driving model may be selected based on the information about the Vehicle 150 that may be determined based on a network communication characterizing the Vehicle 150, such as a communication received from Vehicle 150, a fleet controller associated with Vehicle 150, a third party vendor having information about Vehicle 150, or the like. Additionally or alternatively, the driving model may be inferred based on observed movements of Vehicle during 150 during a predefined time duration (e.g., about 10 seconds, about 20 seconds, or the like), such as based on historical data from a latest time duration, based on a current observation started in response to identifying Vehicle 150 being potentially affecting the driving path of Autonomous Vehicle 120, or the like.

In some exemplary embodiments, a predicted movement pattern of Vehicle 150 within the driving scenario may be predicted using the selected driving model. A movement plan for Autonomous Vehicle 120 may be determined based on the predicted movement pattern of Vehicle 150. Autonomous Vehicle 120 may be instructed to drive based on the generated movement plan. In some exemplary embodiments, different movement plans may be determined based on different predicted speeds of Vehicle 150 determined in accordance with the selected driving model. As an example, based on predicting that Vehicle 150 is about to come to a complete stop for a predetermined time period (such as depicted in Driving Scenario 100c), Autonomous Vehicle 120 may be instructed to keep driving straight in the same speed, to keep driving straight while speeding to a higher speed, or the like. As another example, based on predicting that Vehicle 150 is about to drive in a certain speed (such as depicted in Driving Scenario 100a), Autonomous Vehicle 120 may be instructed to make a complete stop until Vehicle 150 is out of the driving path, to stop until Vehicle 150 reaches a certain location then start driving in a certain direction (e.g., straight, left, right), or the like. As yet another example, based on a predicted direction and curvature of the movement of Vehicle 150 (such as depicted in Driving Scenario 100b), e.g., whether Vehicle 150 is about to drive in a swirl path, Autonomous Vehicle 120 may be instructed to slow down, make a complete stop, or the like.

Additionally or alternatively, Driving Scenario 100 may be a training use case for training an autonomous vehicle driving model to be utilized by Autonomous Vehicle 120, or other similar vehicles, vehicles operated using similar control systems, or the like. The training may be performed based on driving scenarios generated in accordance with driving models selected for Vehicle 150. As an example, a subset of potential driving models that may be applicable to Vehicle 150 may be selected from the plurality of driving models.

In some exemplary embodiments, one or more driving scenarios (such as Driving Scenario 100a) may be generated based on different predicted movement patterns of Vehicle 150 associated with predicted different speed profiles. Additionally or alternatively, one or more driving scenarios (such as Driving Scenario 100b) may be generated based on different predicted movement patterns of Vehicle 150 associated with different curvatures movements.

Additionally or alternatively, one or more driving scenarios (such as Driving Scenario 100c) may be generated based on different predicted movement patterns of different dynamic objects, such as Vehicle 150, Vehicle 160 and Pedestrian 170, predicted based on different combinations of driving models of the different dynamic objects. As an example, based on predicting using a certain movement model of Pedestrian 170 and a certain driving model of Vehicle 150, that Vehicle 150 is about to make a complete stop because Pedestrian 170 is about to cross the street in front of it, the movement plan of Autonomous Vehicle 120 may be to drive straight in a respective speed based on the time required for Pedestrian 170 to cross the street according to the certain movement model selected to Pedestrian 170 and the time required for Vehicle 150 to resume driving according to the certain driving model selected thereto.

In some exemplary embodiments, Driving Scenario 100 may comprise additional dynamic objects, such as Vehicle 160, Pedestrian 170, or the like. A second subset of potentially applicable driving models may be selected for Vehicle 160. The second subset of driving models may be different than the first subset of driving models selected for Vehicle 150. As an example, the first subset of driving models selected for Vehicle 150 may comprise driving models associated with private cars, small vehicle, or the like, while the second subset of driving models selected for Vehicle 160 may comprise models associated with commercial cars, trucks, larger vehicles, buses, vans, construction vehicles, emergency vehicles, or the like. Additionally or alternatively, the first subset of driving models for Vehicle 150 may comprise driving models associated with cautious nighttime driving, or driving in limited visibility or harsh weather conditions, while the second subset of driving models selected for Vehicle 160 may comprise models associated with confident and high-speed driving in clear daylight and in good weather conditions. A second set of predicted movement patterns of Vehicle 160 may be predicted based on the second subset of driving models. A second set movement plans for Autonomous Vehicle 120 may be generated in accordance with the predicted movement patterns of Vehicle 160. Accordingly, a second training set of driving scenarios may be generated based on the second set of movement plans. Additionally or alternatively, the second set of movement plans for Autonomous Vehicle 120 may be generated in accordance with of movement patterns of both of Vehicle 150 and Vehicle 160, predicted based on pairs of driving models applicable together on Vehicle 150 and Vehicle 160.

Additionally or alternatively, the second set of movement plans for Autonomous Vehicle 120 may be generated in accordance with movement patterns of Pedestrian 170. An example, Pedestrian 170 may be stopping on a Crosswalk 107, may affect the movement of Vehicle 150, which may further affect the movement of Vehicle 160, all together affecting the movement pattern determined for Autonomous Vehicle 120. As an example, Autonomous Vehicle 120 is on a T intersection and must give right of way to cars coming from the left and right. Vehicle 150 is coming from the left, so Autonomous Vehicle 120 must give it right of way. With the addition of Pedestrian 170 on Crosswalk 107 in front of Vehicle 150, Autonomous Vehicle 120 must no longer give Vehicle 150 right of way, because Vehicle 150 is forced to stop and give Pedestrian 170 the right of way to cross. Essentially, the presence of Pedestrian 170 on Crosswalk 107, which may not directly be related to the planned route of Autonomous Vehicle 120, has enabled Autonomous Vehicle 120 to enter the intersection.

In some exemplary embodiments, a motion-profiling of Pedestrian 170, such as historical positions or trails, along with motion profile thereof (such as gestures, looking on a certain direction, or the like) may be analyzed to determine their potential movement pattern thereof. As an example, a pedestrian walking on the sidewalk suddenly slows down (information point 1), and is also looking at the ego vehicle (information point 2), meaning the pedestrian wishes to cross.

Figure 2A:
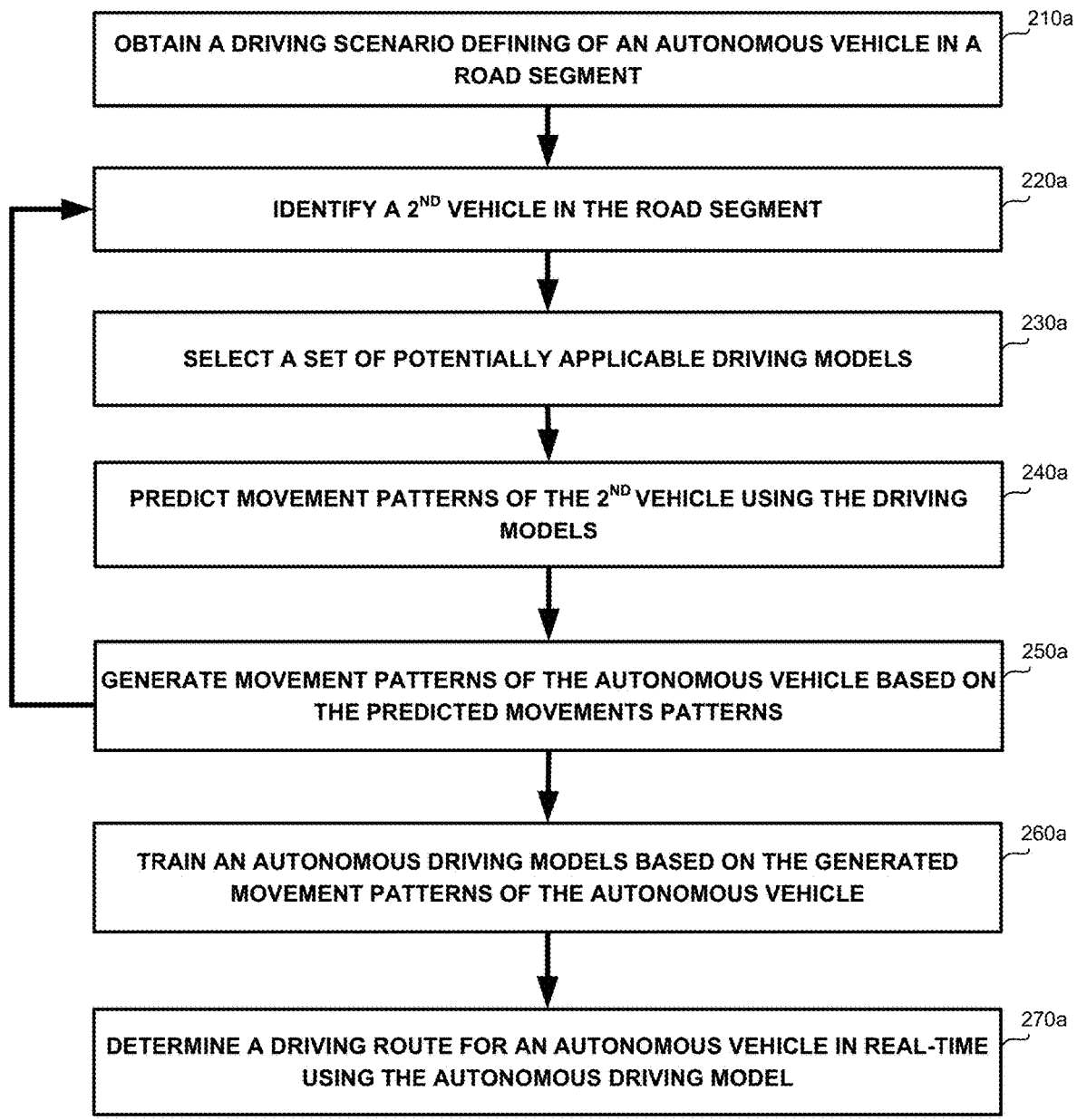
FIGS. 2A-2C show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 210*a*, a driving scenario may be obtained. In some exemplary embodiments, the driving scenario may comprise a representation of a road segment and a driving destination of an autonomous vehicle driving in the road segment.

In some exemplary embodiments, the driving scenario may be a real driving scenario observed by the control system of the autonomous vehicle. The real driving scenario may be a real-time driving scenario (e.g., a driving scenario observed during testing, in real driving, or the like), a historical driving scenario, or the like. Additionally or alternatively, the driving scenario may be obtained from a training set utilized for training an autonomous driving model for the autonomous driving.

In some exemplary embodiments, the driving scenario may comprise representation of the road geometry (such as asphalt, lane dividers, crosswalks, parking lots, stop lines, speed bumps, or the like), static objects in the road segment (such as cones, fences, generic static objects, traffic signs, traffic markers, traffic lights, or the like), dynamic objects in the road segment (such as vehicles, pedestrians, motorcycles, bicycles, animals, or the like), or the like. Additionally or alternatively, the driving scenario may comprise representation of trajectories of dynamic objects, such as vehicles and pedestrians, as tracked by other systems across frames and used as input. Additionally or alternatively, the driving scenario may comprise representation of objects that define traffic rules, such as traffic lights and stop signs, a classification of their status (e.g. green traffic lights), their relevancy to the autonomous vehicle (e.g. stop signs facing other driving lanes), or the like. Additionally or alternatively, the driving scenario may comprise a driving profile of the autonomous vehicle, such as a speed profile, movement profile, or the like; a driving environment profile, such as traffic light classification profile (state of all present traffic lights within the latest N seconds time window), or the like.

In some exemplary embodiments, the driving destination may be updated using driving direction commands, such as short-range navigational commands, long-range navigational commands, or the like. The driving direction commands may be provided manually such as by field engineers during development.

On Step 220*a*, a second vehicle may be identified in the road segment. In some exemplary embodiments, the second vehicle may be a private car, a commercial car, an autonomous car, a truck, a train, a bus, a two-wheeled vehicle, or the like.

On Step 230*a*, a set of potentially applicable driving models may be selected for the second vehicle. In some exemplary embodiments, the set of potentially applicable driving models may be selected from a plurality of driving models known to the control system or the training module. The plurality of driving models may be retained in a designated database, in multiple databases, or the like. The plurality of driving models may comprise at least an autonomous vehicle driving model and a human driver driving model.

In some exemplary embodiments, the set of potentially applicable driving models may comprise a predetermined number of models, such as 5, 10, 20, or the like. The selected predetermined number of models may be associated with a matching score (e.g., a likelihood of the model to be utilized by the second vehicle, or the like). As an example, a predetermined number of models with the highest matching scores may be selected. Additionally or alternatively, the set of potentially applicable driving models may comprise all models having a matching score above a predetermined threshold, such as above 80%, above 90%, or the like.

In some exemplary embodiments, the plurality of driving models may comprise models automatically identified or generated by the control system or the training module, such as by learning behavior of other vehicles, based on historical movements patterns, or the like. As an example, the system may be configured to observe and learn how an autonomous vehicle from a certain vendor would drive, and determine a respective driving model for vehicles operated by that vendor. As another example, the system may be configured to observe and learn how vehicles with certain features drive, and classify vehicles based on such features, (e.g. very heavy vehicles, vehicles with dedicated lanes, emergency vehicles speeding/responding to a call) where grouped instances behave similarly and require similar reactions Additionally or alternatively, behavior classification of other vehicles or of pedestrians may be learned using neural networks, such as implicitly by being shown numerous (and varied) examples of such behaviors. As an example, a type of the vehicle may be extracted through object detection, and the vehicles corresponding to that type may be encoded in a specific input layer to the network. Thus, the network will be able to differentiate between such vehicles and vehicles from other types, and subsequently infer and memorize behavior/driving patterns that characterize them. Alternatively, instead of adding a new layer for every type, the type of the vehicle can be encoded in a single input layer (with likely degraded behavior when compared with a dedicated one-hot encoding).

Additionally or alternatively, the plurality of driving models may comprise actual models, such as known autonomous driving models, autonomous driving models provided by a vendor of a vehicle or an operator of a fleet, or the like. Additionally or alternatively, the plurality of driving models may comprise driving models or patterns associated with certain demographic features of drivers, determined based on research, observation, literature, or the like. Additionally or alternatively, the plurality of driving models may comprise personal driving models associated with certain individuals or drivers, that may be determined automatically based on observation of the driver, the vehicle, or the like; or may be obtained from other sources, such as from insurance companies, driving or traffic databases, or the like.

In some exemplary embodiments, the set of potentially applicable driving models may comprise different autonomous vehicle driving models, provided by different vendors. As an example, the set of potentially applicable driving models may comprise a Tesla™ driving model, a Cruise™ driving model, or the like.

Additionally or alternatively, the set of potentially applicable driving models, may comprise driving models with different physical constraints, such as maximum turning radius, maximum acceleration profile, or the like; driving models acting differently to traffic rules, or the like. As an example, emergency vehicles can ignore traffic lights, public transportation vehicles may use dedicated lanes, or the like.

Additionally or alternatively, the set of potentially applicable driving models may comprise different human driver driving models characterizing different types of human drivers. As an example, the set of potentially applicable driving models may comprise driving models of aggressive drivers vs. non-aggressive drivers, calm drivers vs. nervous drivers, confident drivers vs. non-confident drivers, or the like. As another example, the set of potentially applicable driving models may comprise driving models that may be based on demographic features of the driver, such as female driving models vs. male driving models, young vs. old, or the like. As yet another example, the set of potentially applicable driving models may comprise driving models associated with proactive level, e.g., professional drivers, experienced drivers, or the like, vs. a driver student, a new driver, or the like.

Additionally or alternatively, the set of potentially applicable driving models may comprise driving models of different automation levels. An autonomous vehicle may be operated in different driving modes, e.g., different types of driving models with characteristic dynamic driving task requirements (e.g., expressway merging, high speed cruising, low speed traffic jam, closed-campus operations, or the like). As an example, in a lowest automation level, the automated system may be configured to issue warnings and may momentarily intervene but has no sustained vehicle control. As another example, in a "hands on" driving model, the driver and the automated system may share control of the vehicle, the driver controls steering and the automated system controls engine power to maintain a set speed (Cruise control), Lane Keeping Assistance (LKA), parking assistance, automatic emergency braking which alerts the driver to a crash and permits full braking capacity, or the like. The driver must be ready to retake full control at any time. Other examples may be "hands off" models, "eyes off" models, "mind off" models, "steering wheel optional" models (e.g., no human intervention being required at all), or the like.

In some exemplary embodiments, the set of potentially applicable driving models may comprise a version of the autonomous vehicle driving model being trained, such as a current version, a historic version, or the like.

On Step 240a, a set of predicted movement patterns of the second vehicle within the driving scenario may be predicted using the set of potentially applicable driving models. In some exemplary embodiments, each model of the set of potentially applicable driving models may be applied on the driving scenario in a point of view of the second vehicle, to determine a respective movement pattern thereof.

On Step 250a, a respective movement pattern (e.g., plan) may be generated for the autonomous vehicle based on each predicted movement pattern in the set of predicted movement patterns of the second vehicle.

In some exemplary embodiments, the movement pattern (also referred to as a movement plan) may comprise driving instructions for an autonomous vehicle, such as accelerating or decelerating, lane-keeping on straight and curved roads, swerving around static objects, stopping for crossing pedestrians, negotiating priority with other vehicles on the road, obeying stop signs, traffic lights and other traffic signage, maintaining a safe distance behind other vehicles at high speed, safely navigating around occluded & ambiguous environments, gracefully handling emergency situations, or the like. Additionally or alternatively, the movement pattern may comprise short range driving instructions, such as a next angle (e.g., straight, 30° to the left, 90° to the right, or the like) and speed (to keep the same speed, modify to another speed, or the like) of the movement.

On Step 260a, an autonomous vehicle driving model may be trained. The autonomous vehicle driving model may be configured to be utilized by the autonomous vehicle. The training may be based on the respective movement patterns of the autonomous vehicle generated in Step 250a.

In some exemplary embodiments, multiple driving scenarios with respective driving paths (in accordance with the movement plans) may be generated.

On Step 270a, a driving route for an autonomous vehicle may be determined in real-time using the autonomous driving model.

Figure 2B:
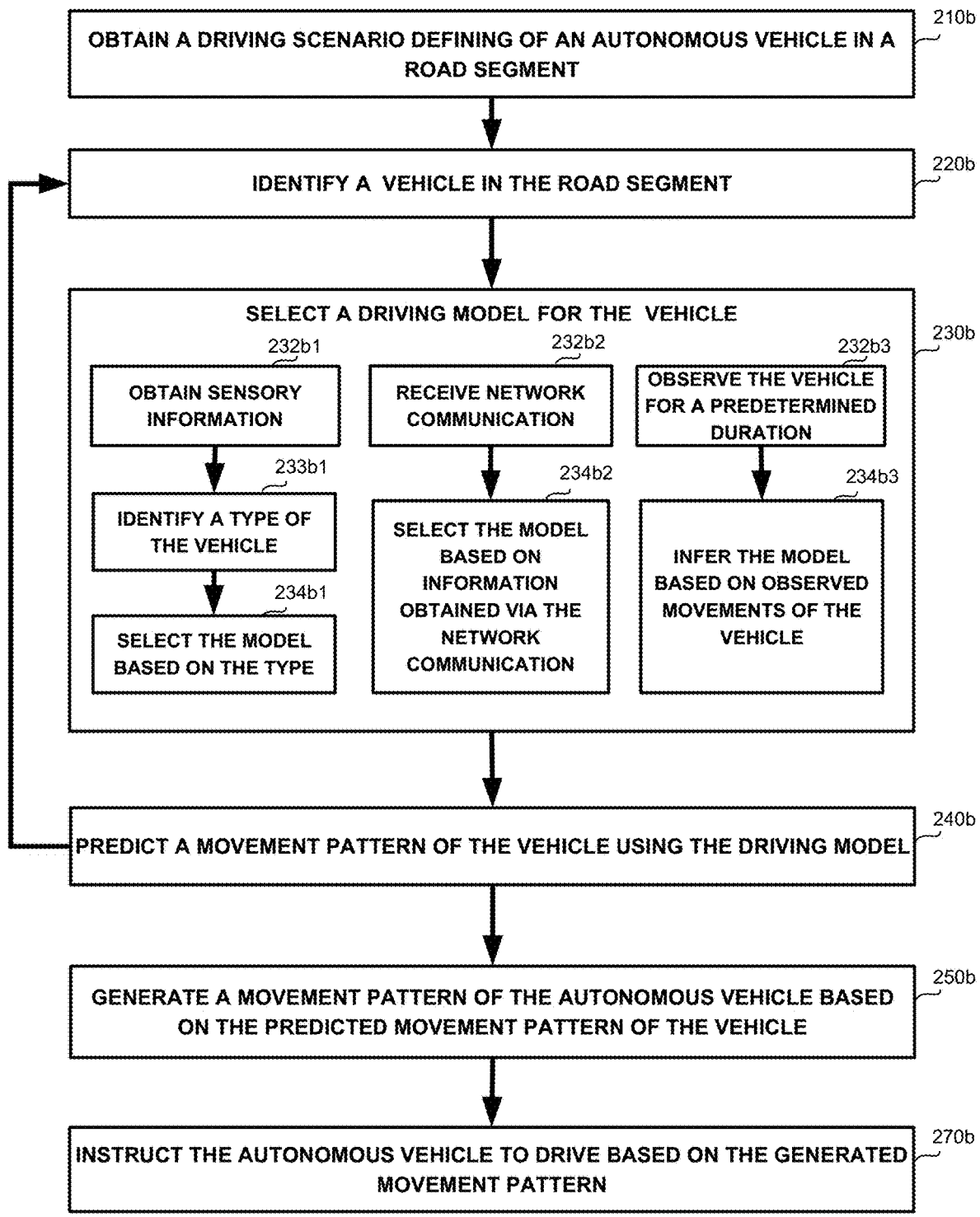

Referring now to FIG. 2B showing a flowchart diagram of a method, in accordance with some exemplary embodiments of the disclosed subject matter.

On Step 210b, a driving scenario may be obtained. In some exemplary embodiments, the driving scenario may comprise a representation of a road segment and a driving destination of an autonomous vehicle driving in the road segment.

In some exemplary embodiments, the driving scenario may be a real driving scenario observed by the control system of the autonomous vehicle during driving.

In some exemplary embodiments, the control system may be configured to perceives the environment of the autonomous vehicle frame-by-frame while maintaining historic information across time. The driving scenario be represented using a functional top-down map configured to be utilized by the control system to navigate and drive the autonomous vehicle within the road segment. The map may aggregate an inclusive representation of the road segment and the environment of the autonomous vehicle as generated by the various perception modules of the autonomous vehicle and control system thereof. Additionally or alternatively, other forms of representations may be utilized.

In some exemplary embodiments, the driving scenario may comprise representation of the road geometry (such as asphalt, lane dividers, crosswalks, parking lots, stop lines, speed bumps, or the like), static objects in the road segment (such as cones, fences, generic static objects, traffic signs, traffic markers, traffic lights, or the like), dynamic objects in the road segment (such as vehicles, pedestrians, motorcycles, bicycles, animals, or the like), or the like. Additionally or alternatively, the driving scenario may comprise representation of trajectories of dynamic objects, such as vehicles and pedestrians, as tracked by other systems across frames and used as input. Additionally or alternatively, the driving scenario may comprise representation of objects that define traffic rules, such as traffic lights and stop signs, a classification of their status (e.g. green traffic lights), their relevancy to the autonomous vehicle (e.g. stop signs facing other driving lanes), or the like. Additionally or alternatively, the driving scenario may comprise a driving profile of the autonomous vehicle, such as a speed profile, movement profile, or the like; a driving environment profile, such as traffic light classification profile (state of all present traffic lights within the latest N seconds time window), or the like.

In some exemplary embodiments, the driving destination may be updated using driving direction commands, such as short-range navigational commands, long-range navigational commands, or the like. The driving direction commands may be provided manually (e.g., by field engineers during development, by drivers, by passengers of the autonomous vehicles, or the like), automatically from long-range navigation systems, or the like.

In some exemplary embodiments, the driving scenario may be a real driving scenario observed by the control system of the autonomous vehicle. Additionally or alternatively, the driving scenario may be obtained from a training set utilized for training an autonomous driving model for the autonomous driving.

On Step 220*b*, a second vehicle may be identified in the road segment.

On Step 230*b*, a driving model may be selected for the second vehicle. In some exemplary embodiments, the driving model may be selected from a plurality of driving models. The plurality of driving models may be the same plurality of driving models described in Step 230*a* of FIG. 2A, e.g., in the training phase, similar thereto, or the like.

In some exemplary embodiments, the optimal driving model may be selected, such as the driving model with the highest matching measurement, the driving model with the highest likelihood to be associated with the second vehicle, the driving model with the highest accuracy in constrained spaces with many parked cars, the driving model with the highest accuracy in navigating parking lots, the driving model that produces the smoothest trajectories for highway driving, the driving model that is able to best negotiate right of way with distant objects, or the like.

On Step 232*b*1, sensory information capturing the second vehicle may be obtained from sensors coupled to the autonomous vehicle. The sensory information may comprise visual information, such as photos or videos capturing the second vehicle, audio information, or the like.

On Step 233*b*1, a type of the second vehicle may be identified based on the sensory information. In some exemplary embodiments, a rough classification may be performed, such as indicating whether the second vehicle is an autonomous vehicle, a driver vehicle, or the like. Additionally or alternatively, a precise classification of the type of the vehicle, the manufacturer, the class, the layout, or the like. As an example, the type of the second vehicle (e.g., Tesla™ Model 3 Rear-Wheel Drive as an example for an autonomous vehicle, Ford Mustang™ as an example for a regular driver vehicle, or the like) may be determined based on a logo associated with the type being identified in the sensory information; based on external features such as body style, car segment, size, or the like; based on the loudness of the second vehicle, or the like.

On Step 234*b*1, the driving model may be selected based on the type of the second vehicle. In some exemplary embodiments, certain types of vehicles may be labeled with certain driving models, such as based on previous classifications, using data analysis, machine learning or the like. As an example, a driving model of Tesla™ Model 3 Rear-Wheel Drive may be determined based on historic observation of autonomous vehicles having similar external features. As another example, a general driving model of autonomous vehicles may be selected for Tesla™ Model 3 Rear-Wheel Drive. As yet another example, a Tesla™ driving model, associated with any type of autonomous vehicles manufactured by Tesla™ of autonomous vehicles may be selected for Tesla™ Model 3 Rear-Wheel Drive.

Additionally or alternatively, on Step 232*b*2, a network communication characterizing the second vehicle may be received. In some exemplary embodiments, information about the second vehicle may be obtained from the network communication, such as a type of the second vehicle, the driving path of the second vehicle, speed profile of the second vehicle, a driving model being utilized to drive the second vehicle, information about the driver of the second vehicle, or the like.

In some exemplary embodiments, the network communication may be obtained from the second vehicle itself, from an operator or vendor thereof, from a control system controlling the second driver, from a computing device of a passenger in the second vehicle, from a navigation system or app utilized to navigate the second vehicle, or the like.

On Step 234*b*2, the driving model may be selected based on the information about the second vehicle.

Additionally or alternatively, on Step 232*b*3, the second vehicle may be observed during a time duration, such during few milliseconds, 10 seconds, a minute, or the like. The observation may be a historical observation, e.g., during the latest time duration; or future observation initiated in response to identifying the second vehicle being potentially affecting the autonomous vehicle.

On Step 234*b*3, the driving model may be inferred based on observed movements of the second vehicle during the time duration.

In some exemplary embodiments, several points of data related to the driving model may be inferred based on the historical positions of the second vehicle, such as the vehicle's current speed, the vehicle's acceleration, the vehicle's steering angle, the vehicle's steering wheel's angular acceleration, or the like. Such points of data may be utilized to provide a strong estimation of the future trajectory of the second vehicle, and according to this trajectory, a motion model can be selected (for example, if acceleration and deceleration over the fixed period changed rapidly, it means this is not a calm driver.)

It may be noted that the same method may be performed with respect to any type of dynamic object, such as pedestrian, animal, or the like. A movement model may be selected instead of a driving model on Step 230*b*. As an example, for pedestrians, movement models of unaccompanied children ("very short pedestrians") may be different than grown up, (e.g., they might unpredictably jump onto the street). As another example, different animals may have behavioral patterns, e.g. at night deer tend to stop and stare in the middle of the road, squirrels and cats sprint in straight lines, or the like.

It may further be noted that the same method may be performed with respect to non-typical static objects having a dynamic impact on the driving path, such as traffic signs, traffic lights, or the like. As an example, a stop sign may be a moving stop sign held by a construction worker which requires paying attention to the worker. Another sign moving alongside a truck could indicate that it's placed in the truck's bed or on it, and thus generate a signal for the navigation system.

Figure 2C:
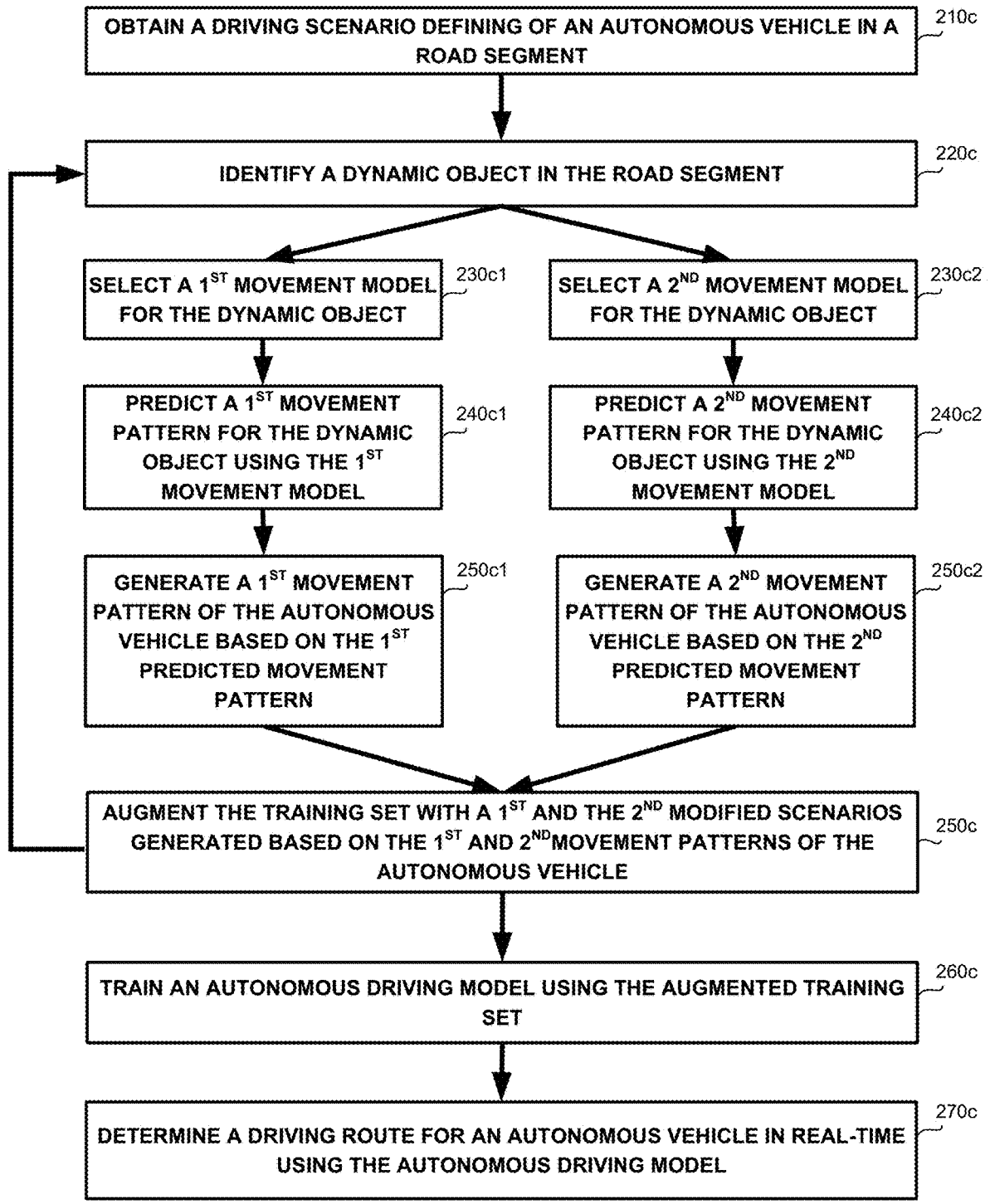

Referring now to FIG. 2C showing a flowchart diagram of a method, in accordance with some exemplary embodiments of the disclosed subject matter.

On Step 210c, a driving scenario may be obtained. The driving scenario may be similar to the driving scenario obtained in Step 210a or 210b.

On Step 220c, a dynamic object may be identified in the road segment. In some exemplary embodiments, the dynamic object may be a vehicle, a pedestrian, or the like.

On Step 230c1 and Step 230c2, a first and a second movement models may be selected for the dynamic object.

On Steps 240c1 and 240c2, a first and a second predicted movement patterns of the dynamic object within the driving scenario may be predicted using the first and the second movement models, respectively.

On Steps 250c1 and 250c2, a first and a second movement patterns may be generated for the autonomous vehicle, based on the first and the second predicted movement pattern of the dynamic object, respectively.

On Step 260c, an autonomous vehicle driving model may be trained. The training may be based on the respective movement patterns of the autonomous vehicle generated in Step 250c.

In some exemplary embodiments, multiple driving scenarios with respective driving paths (in accordance with the movement plans) may be generated.

On Step 270c, a driving route for an autonomous vehicle may be determined in real-time using the autonomous driving model.

Figure 3:
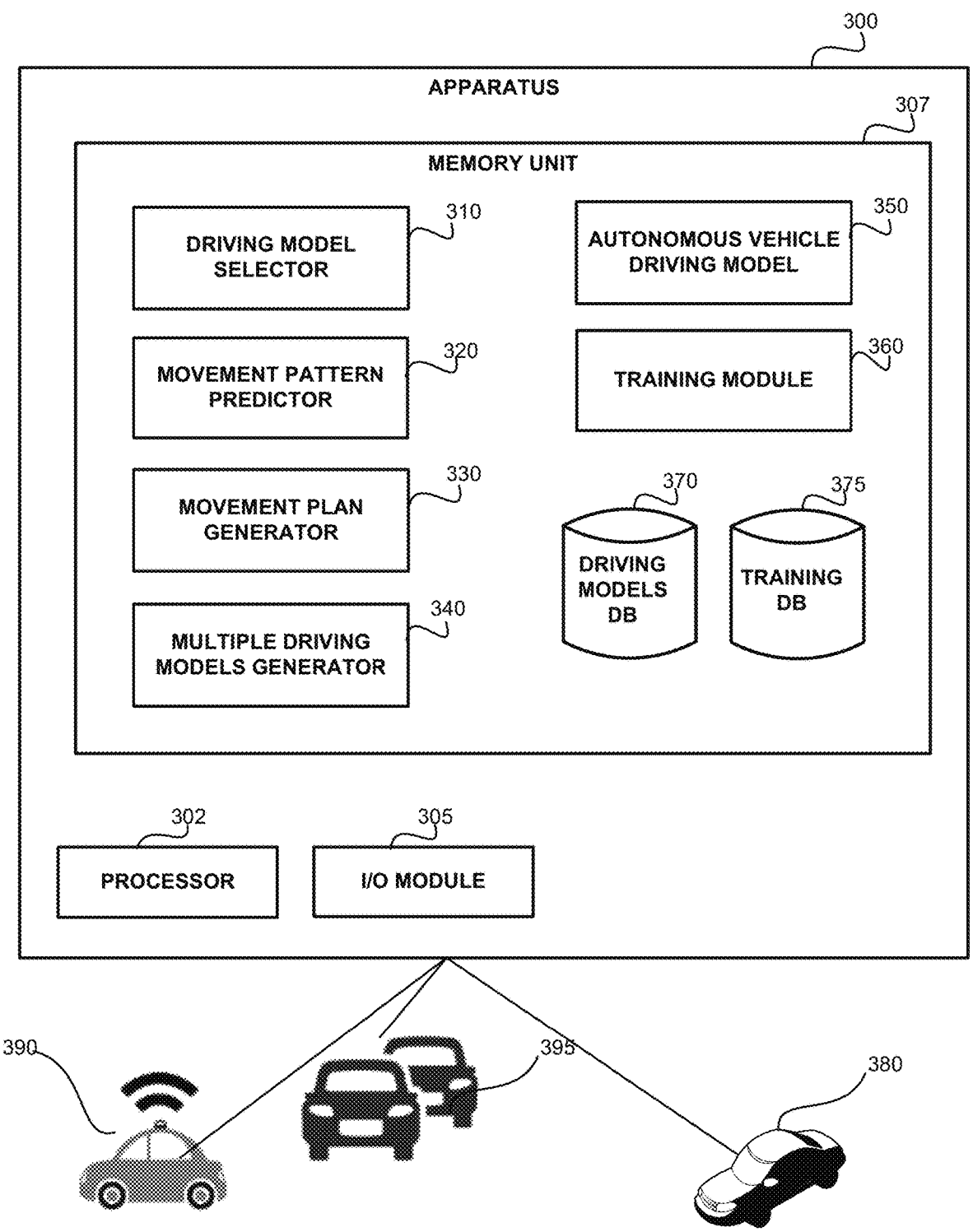
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

An Apparatus 300 may be configured to support generation and training of autonomous driving models for autonomous vehicles, in accordance with the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. I/O Module 305 may be utilized to provide an output to and receive input from a user, a device, a sensor, or the like, such as, for example receiving an input from one or more sensors of Autonomous Vehicle 380, providing output for one or systems of Autonomous Vehicle 380, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Apparatus 300 may be configured to provide autonomous driving model, such as Autonomous Vehicle Driving Model 350, to one or more connected autonomous vehicles, such as Autonomous Vehicle 380, Vehicle 382, Vehicle 385, or the like. The autonomous driving model may be provided to the vehicles via I/O Module 305, to be utilized by a navigation system (not shown) of Autonomous Vehicle 380, or other navigation systems (such as to Apparatus 400 in FIG. 4) to determine a driving route in real-time. Additionally or alternatively, Apparatus 300 may be connected directly to the navigation system of Autonomous Vehicle 380, may be a component of the control system of Autonomous Vehicle 380, may be the control system of Autonomous Vehicle 380, or the like. Additionally or alternatively, Apparatus 300 may be utilized to train, retrain or update driving models, such as Autonomous Vehicle Driving Model 350 or other driving models in Driving Models Database 370, to provide dynamic driving models to autonomous vehicles, such as Autonomous Vehicle 380, or the like. Additionally or alternatively, Apparatus 300 may be utilized to generate training data, augment training datasets, such as Training Database 375, or the like.

In some exemplary embodiments, Alternative Driving Models Generator 340 may obtain a driving scenario. The driving scenario may comprise a representation of a road segment and a driving destination of an autonomous vehicle driving in the road segment, such as Autonomous Vehicle 380. In some exemplary embodiments, the driving scenario may comprise dynamic objects in the road segment, such as a second vehicle, that may be identified by Apparatus 300 as potentially affecting the driving path of the autonomous vehicle.

In some exemplary embodiments, Alternative Driving Models Generator 340 may be configured to generate one or more modified driving scenario defining a driving path, a movement plan, or a driving instruction, or the like, based on an existing driving scenario. In some exemplary embodiments, Alternative Driving Models Generator 340 may be configured to generate the modified driving scenario by predicting different movement patterns of dynamic objects in existing driving scenarios, using multiple AI model.

In some exemplary embodiments, Driving Model Selector 310 may be configured to select a driving model for dynamic objects in the driving scenario, that may potentially affect the driving path of the autonomous vehicle, such as the second vehicle. Driving Model Selector 310 may be configured to select the driving model from a plurality of driving models that comprise autonomous vehicle driving models and human driver driving models, such as from Driving Model Database 370.

In some exemplary embodiments, Movement Pattern Predictor 320 may be configured to predict, using each driving model selected by Driving Model Selector 310, a predicted movement pattern of the second vehicle within the driving scenario.

In some exemplary embodiments, Movement Plan Generator 330 may be configured to generate, based on each predicted movement pattern of the second vehicle, a movement pattern for the autonomous vehicle.

In some exemplary embodiments, Training Module 360 may be configured to train Autonomous Vehicle Driving Model 350 Autonomous Vehicle Driving Model 350 may be configured to provide a predicted driving path within a road segment based on a a representation of the road segment, given a representation of a driving scenario, or the like. For each driving scenario, Training Module 360 may be configured to indicate to Autonomous Vehicle Driving Model 350 whether the original driving path is applicable, or determine a new driving path, to determine a driving plan, or the like.

In some exemplary embodiments, Autonomous Vehicle Driving Model 350 may be trained using Training Dataset 385. Training Dataset 375 may comprise original driving scenarios defining real driving scenarios, such as obtained from autonomous vehicles systems, manually annotated scenarios, or the like. Additionally or alternatively, Training Dataset 375 may comprise map based annotated modified scenarios, or synthetically generated scenarios generated by Alternative Driving Models Generator 340, or the like. It may be noted that Training Dataset 375 may be continuously augmented with new or modified driving scenarios generated using Alternative Driving Models Generator 340, some of which affect the original driving path and some of which do not affect the original driving path.

Figure 4:
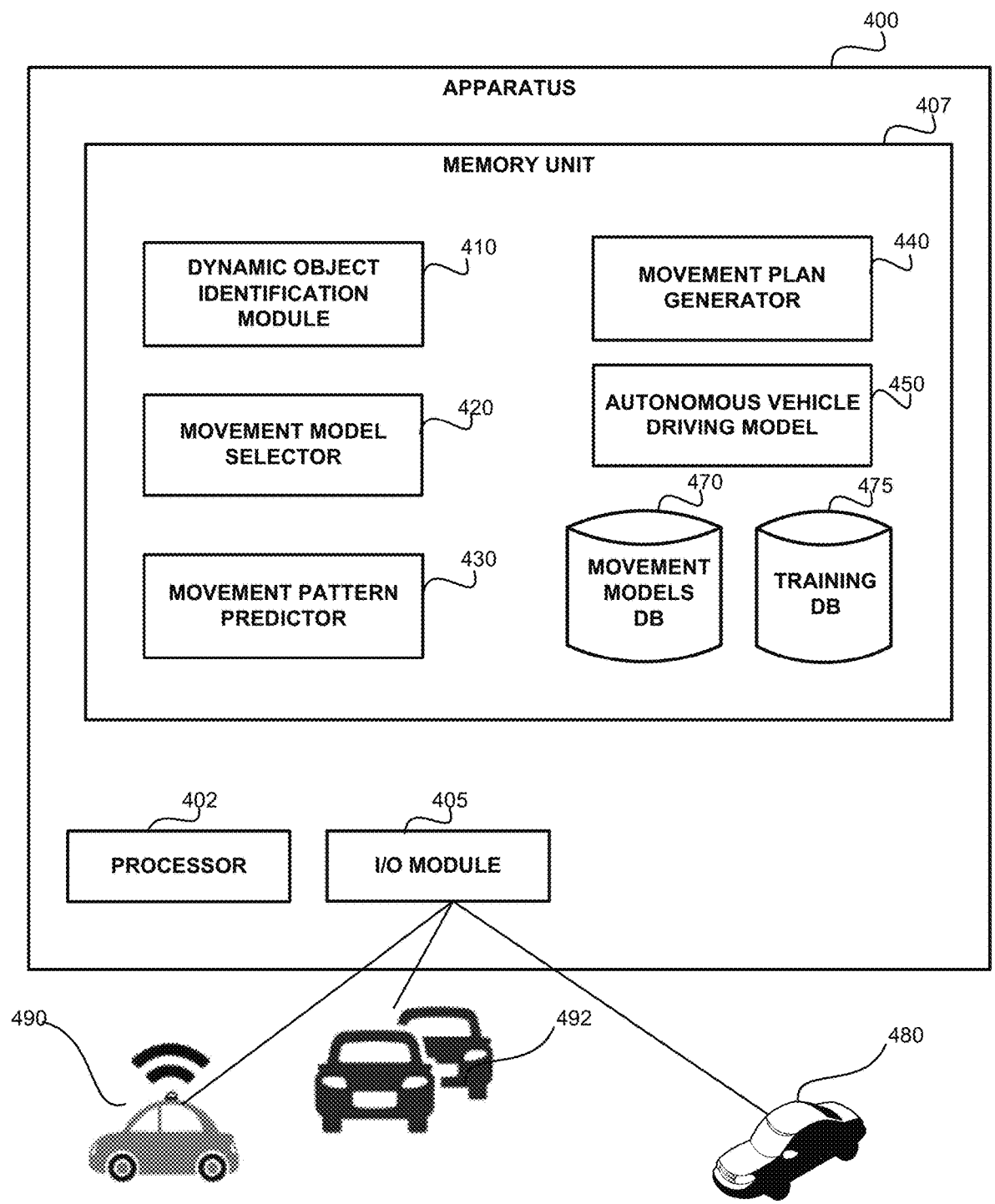
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter.

An Apparatus 400 may be configured to support generation of models for generating top-down functional road maps for autonomous vehicles, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user, a device, a sensor, or the like, such as, for example receiving an input from one or more sensors of Autonomous Vehicle 480, providing output for one or systems of Autonomous Vehicle 480, or the like.

In some exemplary embodiments, Apparatus 400 may comprise Memory 307. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Apparatus 400 may be configured to provide Autonomous Vehicle Driving Model 450, to Autonomous Vehicle 480, such as via I/O Module 405. Autonomous Vehicle Driving Model 450 may be utilized by a navigation system (not shown) of Autonomous Vehicle 480 to determine a driving route in real-time. Additionally or alternatively, Apparatus 400 may be connected directly to the navigation system of Autonomous Vehicle 480, may be a component of the control system of Autonomous Vehicle 480, may be the control system of Autonomous Vehicle 480, or the like.

In some exemplary embodiments, Apparatus 400 may be configured to continuously monitor the environment of Autonomous Vehicle 480, based on sensors mounted on Autonomous Vehicle 480, or other sensors. Additionally or alternatively, Apparatus 400 may obtain an input from Autonomous Vehicle 480 or systems thereof, describing a driving scenario representing the road segment Autonomous Vehicle 480 drives in, the driving path of Autonomous Vehicle 480, the destination of Autonomous Vehicle 480, or the like.

In some exemplary embodiments, Dynamic Object Identification Module 410 may be configured to identify dynamic object in the driving scenario, such as pedestrian, vehicles, or the like. Dynamic Object Identification Module 410 may be configured to determine whether the dynamic object potentially affects the driving path of Autonomous Vehicle 480. In particular, Dynamic Object Identification Module 410 may be configured to identify a second vehicle, such as Vehicle 482, in the road segment to determine whether and how its path affects the driving path of Autonomous Vehicle 480. Dynamic Object Identification Module 410 may be configured to identify that a dynamic object is a relevant dynamic object based on characteristics of the object, such as speed, trajectory, or the like. As an example, Dynamic Object Identification Module 410 may be configured to determine that another car is entering an intersection at high speed is a relevant dynamic object, even if the ego vehicle has right of way. The speed and general trajectory of that other car are known to Dynamic Object Identification Module 410 during annotation. Additionally or alternatively, the object relevancy may be further specialized into categories: relevant for swerving, priority, emergency priority, highway merging, or the like. In some exemplary embodiments, Movement Model Selector 420 may be configured to select a movement model for dynamic objects identified by Dynamic Object Identification Module 410, such as selecting a driving model for Vehicle 482. Movement Model Selector 420 may be configured to select the driving model from a plurality of driving models that comprise autonomous vehicle driving models and human driver driving models, such as from Movement Model Database 380.

In some exemplary embodiments, Movement Model Selector 420 may select Driving Model 450 as a driving model for Vehicle 482.

In some exemplary embodiments, Movement Model Selector 420 may be configured to select the movement model based on a type of Vehicle 482. Additionally or alternatively, Movement Model Selector 420 may be configured to select the movement model based on information about Vehicle 482, obtained via a network communication characterizing Vehicle 482, such as directly from Vehicle 482, from other vehicles in the road segment, such as Vehicles 485, or the like.

Additionally or alternatively, Movement Model Selector 420 may be configured to select the movement model based on observed movements of Vehicle 482 during a predetermined time duration.

In some exemplary embodiments, Movement Pattern Predictor 430 may be configured to predict, the movement model selected by Movement Model Selector 420, a predicted movement pattern of Vehicle 482 (or respectively for other dynamic objects) within the driving scenario.

In some exemplary embodiments, Movement Plan Generator 440 may be configured to generate, based on the predicted movement pattern of Vehicle 482 (or respectively the other dynamic objects), a movement pattern for Autonomous Vehicle 480. In some exemplary embodiments, the movement pattern may be determined using Driving Model 450. Apparatus 400 may be configured to instruct Autonomous Vehicle to drive based on the generated movement pattern.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a driving scenario, wherein the driving scenario comprises a representation of a road segment and a driving destination of an autonomous vehicle driving in the road segment, wherein the driving scenario comprises a second vehicle in the road segment;
   selecting at least two different driving models that are usable for predicting movement patterns of the second vehicle, wherein the at least two different driving models are selected from a predefined plurality of driving models, wherein the predefined plurality of driving models is known prior to said obtaining the driving scenario;
   predicting at least two movement patterns of the second vehicle within the driving scenario according to the at least two different driving models, respectively;
   for each one of the at least two movement patterns of the second vehicle, generating a respective movement pattern for the autonomous vehicle, thereby generating at least two movement patterns for the autonomous vehicle;
   training an autonomous driving model based on the at least two movement patterns generated for the autonomous vehicle, thereby obtaining a trained autonomous driving model; and
   providing the trained autonomous driving model to a second autonomous vehicle which is configured to use the trained autonomous driving model for autonomous driving.

2. The method of claim 1, wherein the predefined plurality of driving models comprises a version of the autonomous driving model that is under training.

3. The method of claim 1, further comprises instructing the autonomous vehicle to drive based on the at least two movement patterns for the autonomous vehicle, wherein the at least two movement patterns for the autonomous vehicle comprise at least two different driving instructions, respectively.

4. The method of claim 3, wherein said selecting the at least two different driving models for the second vehicle comprises:
   obtaining sensory information from sensors coupled to the autonomous vehicle capturing the second vehicle;
   identifying a type of the second vehicle based on the sensory information;
   selecting the at least two different driving models based on the type of the second vehicle.

5. The method of claim 3, wherein said selecting the at least two different driving models for the second vehicle comprises:
   receiving a network communication characterizing the second vehicle, whereby obtaining information about the second vehicle; and
   selecting the at least two different driving models based on the information about the second vehicle.

6. The method of claim 3, wherein said selecting the at least two different driving models for the second vehicle comprises:
   observing the second vehicle during a time duration; and
   inferring the at least two different driving models based on observed movements of the second vehicle during the time duration.

7. The method of claim 1, wherein the predefined plurality of driving models comprises:
   a first autonomous vehicle driving model, and a second autonomous vehicle driving model, wherein the first autonomous vehicle driving model and the second autonomous vehicle driving model are different and provided by different vendors.

8. The method of claim 1, wherein the predefined plurality of driving models comprises:
   a first human driver driving model, and a second human driver driving model, wherein the first human driver driving model and the second human driver driving model are different and characterize different types of human drivers.

9. The method of claim 1, wherein each predefined driving model is associated with a matching score, and wherein said selecting comprises selecting a predefined number of driving models with the highest matching scores.

10. The method of claim 1, wherein each predefined driving model is associated with a matching score, and wherein said selecting comprises selecting a predefined number of driving models having a matching score above a predetermined threshold.

11. A computerized apparatus having a processor, the processor being adapted to perform the steps of:
   obtaining a driving scenario, wherein the driving scenario comprises a representation of a road segment and a driving destination of an autonomous vehicle driving in the road segment, wherein the driving scenario comprises a second vehicle in the road segment;
   selecting at least two different driving models that are usable for predicting movement patterns of the second vehicle, wherein the at least two different driving models are selected from a predefined plurality of driving models, wherein the predefined plurality of driving models is known prior to said obtaining the driving scenario;
   predicting at least two movement patterns of the second vehicle within the driving scenario according to the at least two different driving models, respectively;
   for each one of the at least two movement patterns of the second vehicle, generating a respective movement pattern for the autonomous vehicle, thereby generating at least two movement patterns for the autonomous vehicle;
   training an autonomous driving model based on the at least two movement patterns generated for the autonomous vehicle, thereby obtaining a trained autonomous driving model;

and providing the trained autonomous driving model to a second autonomous vehicle which is configured to use the trained autonomous driving model for autonomous driving.

12. The computerized apparatus of claim 11, wherein the processor is further adapted to perform the steps of instructing the autonomous vehicle to drive based on the at least two movement patterns for the autonomous vehicle, wherein the at least two movement patterns for the autonomous vehicle comprise at least two different driving instructions, respectively.

13. The computerized apparatus of claim 11, wherein said selecting the at least two different driving models for the second vehicle comprises:
   obtaining sensory information from sensors coupled to the autonomous vehicle capturing the second vehicle;
   identifying a type of the second vehicle based on the sensory information;
   selecting the at least two different driving models based on the type of the second vehicle.

14. The computerized apparatus of claim 11, wherein said selecting the at least two different driving models for the second vehicle comprises:
   receiving a network communication characterizing the second vehicle, whereby obtaining information about the second vehicle; and
   selecting the at least two different driving models based on the information about the second vehicle.

15. The computerized apparatus of claim 11, wherein said selecting the at least two different driving models for the second vehicle comprises:
   observing the second vehicle during a time duration; and
   inferring the at least two different driving models based on observed movements of the second vehicle during the time duration.

16. The computerized apparatus of claim 11, wherein the predefined plurality of driving models further comprises: first and second autonomous vehicle driving models, wherein the first autonomous vehicle driving model and the second autonomous vehicle driving model are different and provided by different vendors.

17. The computerized apparatus of claim 11, wherein the predefined plurality of driving models further comprises: first and second human driver driving models, wherein the first human driver driving model and the second human driver driving model are different and characterize different types of human drivers.

18. The computerized apparatus of claim 11, wherein each predefined driving model is associated with a matching score, and wherein said selecting comprises selecting a predefined number of driving models with the highest matching scores.

19. The computerized apparatus of claim 11, wherein each predefined driving model is associated with a matching score, and wherein said selecting comprises selecting a predefined number of driving models having a matching score above a predetermined threshold.

20. A computer program product comprising a non-transitory computer readable storage medium retaining program instructions, which program instructions when read by a processor, cause the processor to perform a method comprising:
   obtaining a driving scenario, wherein the driving scenario comprises a representation of a road segment and a driving destination of an autonomous vehicle driving in the road segment, wherein the driving scenario comprises a second vehicle in the road segment;
   selecting at least two different driving models that are usable for predicting movement patterns of the second vehicle, wherein the at least two different driving models are selected from a predefined plurality of driving models, wherein the predefined plurality of driving models is known prior to said obtaining the driving scenario;
   predicting at least two movement patterns of the second vehicle within the driving scenario according to the at least two different driving models, respectively;
   for each one of the at least two movement patterns of the second vehicle, generating a respective movement pattern for the autonomous vehicle, thereby generating at least two movement patterns for the autonomous vehicle;
   training an autonomous driving model based on the at least two movement patterns generated for the autonomous vehicle, thereby obtaining a trained autonomous driving model; and
   providing the trained autonomous driving model to a second autonomous vehicle which is configured to use the trained autonomous driving model for autonomous driving.

* * * * *